US007450013B2

(12) United States Patent
Clancy et al.

(10) Patent No.: US 7,450,013 B2
(45) Date of Patent: Nov. 11, 2008

(54) SYSTEM AND METHOD FOR AUTHENTICATED DETACHMENT OF PRODUCT TAGS

(75) Inventors: Terry Clancy, County Kildare (IE); Peter Schneider, Neckargemuend (DE); Peter Bremer, Beerfelden-Olfen (DE)

(73) Assignee: Chechpoint Systems, Inc., Thorofare, NJ (US)

( * ) Notice: Subject to any disclaimer, the term of this patent is extended or adjusted under 35 U.S.C. 154(b) by 86 days.

(21) Appl. No.: 11/736,949

(22) Filed: Apr. 18, 2007

(65) Prior Publication Data

US 2007/0188333 A1 Aug. 16, 2007

Related U.S. Application Data

(63) Continuation of application No. 11/060,839, filed on Feb. 18, 2005, now Pat. No. 7,242,304.

(60) Provisional application No. 60/546,254, filed on Feb. 20, 2004.

(51) Int. Cl.

| | |
|---|---|
| ***G08B 13/14*** | (2006.01) |
| ***G06K 5/00*** | (2006.01) |
| ***G06K 15/00*** | (2006.01) |
| ***G07B 15/02*** | (2006.01) |
| ***E05B 65/00*** | (2006.01) |
| ***E05B 69/00*** | (2006.01) |
| ***F16B 21/00*** | (2006.01) |

(52) U.S. Cl. .............. 340/572.9; 340/572.1; 340/572.3; 340/572.7; 340/568.1; 340/572.9; 235/380; 235/381; 235/382; 235/383; 235/384; 235/385; 235/492; 70/57.1; 70/58; 24/704.1; 24/704.2

(58) Field of Classification Search .............. 340/572.1, 340/572.3, 572.9, 568.1; 235/380–385, 492; 70/57.1, 58; 24/704.1, 704.2

See application file for complete search history.

(56) References Cited

U.S. PATENT DOCUMENTS

| | | | |
|---|---|---|---|
| 3,752,960 | A | 8/1973 | Walton |
| 3,816,708 | A | 6/1974 | Walton |
| 3,858,280 | A | 1/1975 | Martens |
| 4,002,886 | A | 1/1977 | Sundelin |
| 4,223,830 | A | 9/1980 | Walton |
| 4,299,040 | A | 11/1981 | Minasy |
| 4,553,136 | A | 11/1985 | Anderson, III et al. |
| 4,575,624 | A | 3/1986 | Klinkhardt |
| 4,580,041 | A | 4/1986 | Walton |
| 4,656,463 | A | 4/1987 | Anders et al. |

(Continued)

FOREIGN PATENT DOCUMENTS

| | | |
|---|---|---|
| EP | 372716 | 4/1990 |

(Continued)

*Primary Examiner*—George A Bugg
*Assistant Examiner*—Lam P Pham
(74) *Attorney, Agent, or Firm*—Caesar, Rivise, Bernstein, Cohen & Pokotilow, Ltd.

(57) ABSTRACT

A system and method for releasing a security tag from an article automatically at a point of sale without the need for store employee involvement, assuming a valid sale is occurring. A system and method for releasing a security tag from an article automatically at a point of sale that tracks the detacher operation and the time and date of such operation.

5 Claims, 12 Drawing Sheets

U.S. PATENT DOCUMENTS

| | | | | |
|---|---|---|---|---|
| 4,870,391 | A | | 9/1989 | Cooper |
| 4,940,968 | A | | 7/1990 | DeNood |
| 4,993,245 | A | | 2/1991 | Ott |
| 5,005,125 | A | | 4/1991 | Farrar et al. |
| 5,059,951 | A | | 10/1991 | Kaltner |
| 5,105,190 | A | | 4/1992 | Kip et al. |
| 5,151,684 | A | | 9/1992 | Johnsen et al. |
| 5,341,125 | A | | 8/1994 | Plonsky et al. |
| 5,347,263 | A | | 9/1994 | Carroll et al. |
| 5,426,419 | A | | 6/1995 | Nguyen et al. |
| 5,430,441 | A | | 7/1995 | Bickley et al. |
| 5,446,447 | A | | 8/1995 | Carney et al. |
| 5,469,142 | A | | 11/1995 | Bergman et al. |
| 5,535,606 | A | | 7/1996 | Nguyen et al. |
| 5,587,703 | A | | 12/1996 | Dumont |
| 5,594,228 | A | | 1/1997 | Swartz et al. |
| 5,745,036 | A | | 4/1998 | Clare |
| 5,942,978 | A | | 8/1999 | Shafer |
| 5,955,951 | A | * | 9/1999 | Wischerop et al. ....... 340/572.8 |
| 6,025,780 | A | | 2/2000 | Bowers et al. |
| 6,084,498 | A | | 7/2000 | Stelter et al. |
| 6,154,135 | A | | 11/2000 | Kane et al. |
| 6,169,483 | B1 | | 1/2001 | Ghaffari et al. |
| 6,333,692 | B1 | | 12/2001 | Andersen et al. |
| 6,429,776 | B1 | | 8/2002 | Alicot et al. |
| 6,486,780 | B1 | | 11/2002 | Garber et al. |
| 6,598,791 | B2 | | 7/2003 | Bellis, Jr. et al. |
| 6,646,554 | B1 | | 11/2003 | Goff et al. |
| 6,801,130 | B2 | | 10/2004 | Campero |
| 6,857,567 | B2 | | 2/2005 | Latimer et al. |
| 7,017,808 | B2 | | 3/2006 | Holzer |
| 7,073,236 | B2 | | 7/2006 | Xue et al. |
| 7,081,818 | B2 | | 7/2006 | Eckstein et al. |
| 2003/0075602 | A1 | | 4/2003 | Wike, Jr. et al. |

FOREIGN PATENT DOCUMENTS

| | | |
|---|---|---|
| GB | 2181326 | 4/1987 |
| WO | 9953435 | 10/1999 |
| WO | 02071346 | 9/2002 |

* cited by examiner

SYSTEM AND METHOD FOR AUTHENTICATED DETACHMENT OF PRODUCT TAGS

CROSS-REFERENCE TO RELATED APPLICATIONS

This continuation application claims the benefit under 35 U.S.C. §120 of application Ser. No. 11/060,839 filed on Feb. 18, 2005 which in turn claims the benefit under 35 U.S.C. §119(e) of U.S. Provisional A.S.N. 60/546,254 and all of which are entitled SYSTEM AND METHOD FOR AUTHENTICATED DETACHMENT OF PRODUCT TAGS and all of whose entire disclosures are incorporated by reference herein.

BACKGROUND OF THE INVENTION

1. Field of Invention

This invention relates to generally to product security tags and, more particularly, to a system and method for automatically releasing a security tag.

2. Description of Related Art

When attempting to reduce or eliminate shoplifting of store inventory, the use of security tags (also known as anti-theft tags)has been significant in accomplishing this goal. These tags, using various wireless interrogation technologies, such as electromagnetic (EM), acousto-magnetic (AM), radio frequency (RF), etc., are attached to a store item and are interrogated as they pass through an interrogation site (e.g., a pair of field-emitting and signal receiving pedestals) usually located at the store exit. If these tags are not removed from the item, or de-activated, before entering the interrogation site, they will set off an alarm at the interrogation site, thereby alerting store personnel to the theft. With particular regard to the wireless RF technology, the security tags may include a radio frequency identification (RFID) integrated circuit (IC) having a memory that includes data (e.g., product ID information such as a serial number, unique identification number, price, etc.) associated with the store item that the tag is attached to. When the security tag including the RFID IC passes by a reader (e.g., comprising a transmitter/receiver), the RFID IC emits a signal (through a resonant circuit or an antenna) that contains the data associated with the store item. Because this type of security tag emits such particularized data, this type of security tag is also referred to as an "identification tag."

In other instances, a "value-denial" tag is used whereby the security tag is filled with a colored dye. The tag can only be removed by a cashier who has the proper release tool. If a person leaves the store without having the tag removed by a cashier, if that person attempts to remove the tag himself/herself, the tag harmlessly explodes, thereby destroying the value of the stolen item.

However, it should be understood that 70% of store inventory "shrinkage" occurs due to acts by store employees known as "sweethearting." For example, a cashier may knowingly defeat the security tag by removing it or de-activating it and then not ring up the article for sale.

Also, where a valid sale of an item having an security tag attached thereto does occur, the security tag detachment stage usually occurs separate from the UPC barcode stage. Thus, for example, the cashier may scan the UPC barcode on the item which rings up the sale; next, the cashier then needs to place the item into a separate location to effect security tag detachment. This, slows down the purchase process at the point of sale (POS).

Thus, there remains a need for preventing such "sweetheart" acts by employees by preventing the cashier from controlling the security tag removal stage. In addition, there also remains a need to make the POS more efficient by combining the sale ring up along with security tag detachment.

All references cited herein are incorporated herein by reference in their entireties.

BRIEF SUMMARY OF THE INVENTION

A system for the automatic detachment of a security tag (e.g., an identification tag) from an article only upon the sale of the article. The system comprises: a reader (e.g., an RFID reader) located at the point of sale that reads the security tag to identify the article being purchased; a point of sale (POS) machine (e.g., a cash register (e.g., Sharp XE-A301/A302 ECR/EPOS, Gold G215, etc.), a credit/debit card reader, any type of money/currency transfer machine for supporting the purchase of the article, etc.) in communication with the reader, that verifies if the read item is ready for sale; and a detacher, in communication with, and controlled by, the POS machine, whereby the detacher is commanded to release the security tag from the article only if the POS machine verifies that the read item is ready for sale.

A system for the automatic detachment of a security tag from an article only upon the sale of the article. The system comprises: a reader (e.g., an RFID reader) located at the point of sale that reads the security tag to identify the article being purchased; a database, in communication with the reader, that verifies if the read item is ready for sale; a detacher, in communication with, and controlled by, the database, wherein the detacher is commanded to release the security tag from the article only if the database verifies that the read item is ready for sale; and a point of sale (POS) machine (e.g., a cash register (e.g., Sharp XE-A301/A302 ECR/EPOS, Gold G215, etc.), a credit/debit card reader, any type of money/currency transfer machine for supporting the purchase of the article, etc.), in communication with the database, wherein the database conveys the article identity and sales information to the POS machine upon the release of the security tag from the article.

A security tag for securement to an article for sale, wherein the security tag comprises an article attachment lock that can only be released from the article by a separate device independent of any human intervention.

A method for automatically detaching a security tag from an article upon the sale of the article at a point of sale. The method comprises the steps of: reading identification data from the security tag associated with the article to identify the security tag; verifying if the article is ready for sale; activating a detacher, independently of human intervention, to release the security tag if the article is ready for sale.

A system for the automatic detachment of a security tag (e.g., an identification tag) from an article at a point of sale. The system comprises: a reader (e.g., an RFID reader) located at the point of sale that reads the security tag to identify the article being purchased; a detacher in communication with the reader and wherein the detacher releases the security tag from the article once the reader has read the security tag; and a database, in communication with the reader, which stores the identity of the detacher when the detacher releases the security tag.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1A:
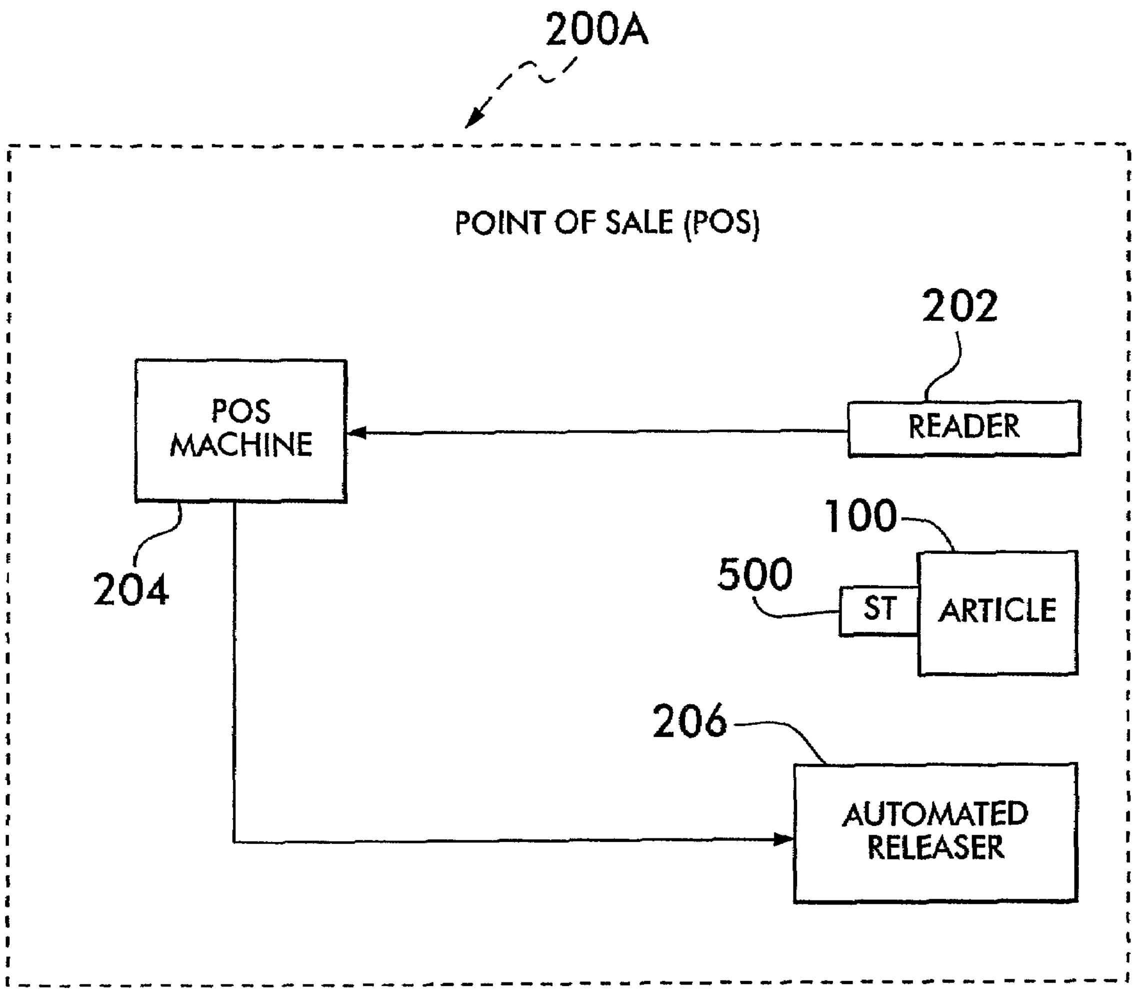
FIG. 1A is a functional diagram of the system of the present invention.
Figure 1B:
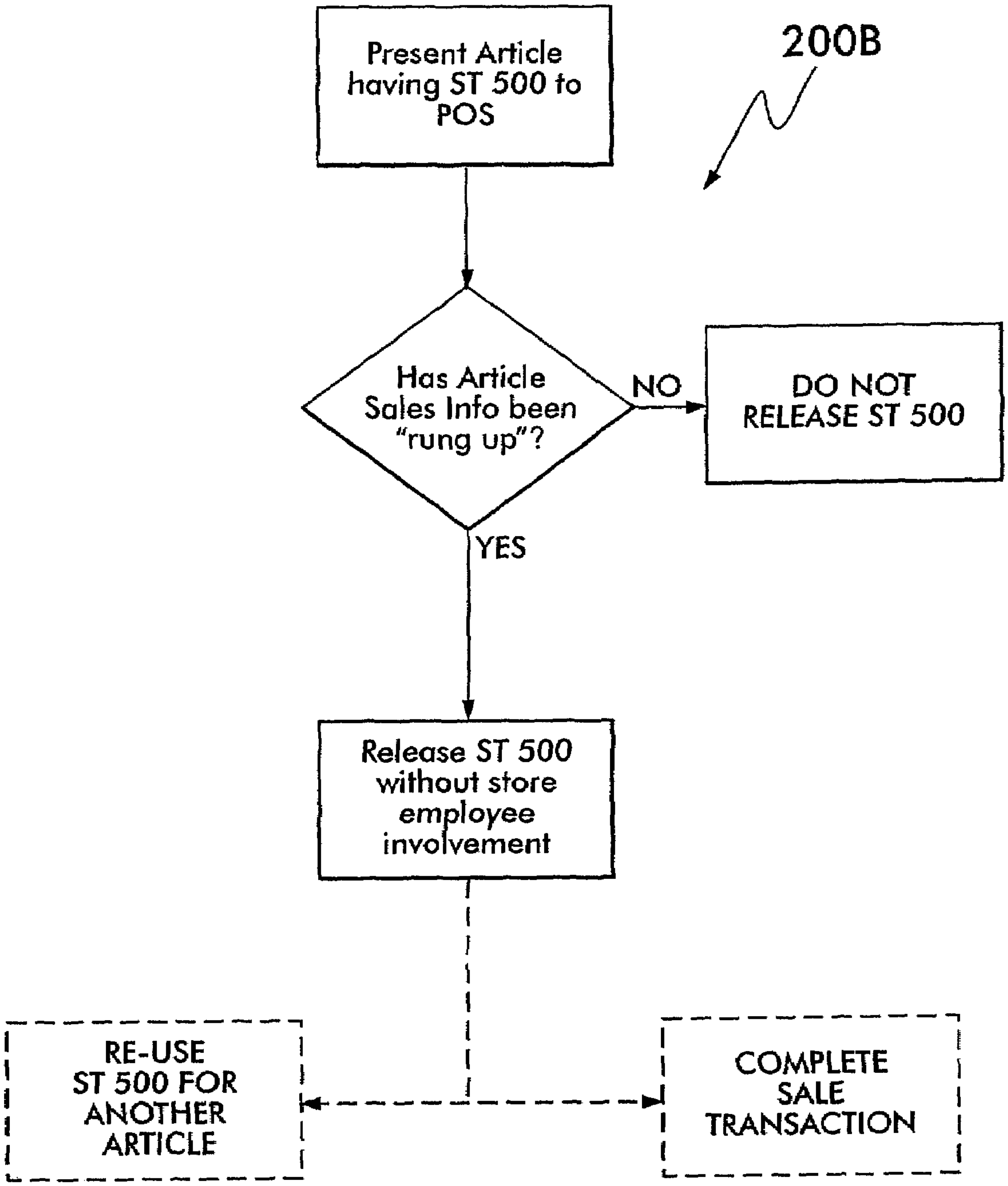
FIG. 1B is a functional diagram of the method of the present invention.

The system 200A (FIG. 1A) and method 200B (FIG. 1B) of the present invention comprises the automatic release of a security tag (ST) 500 from an article 100 at the POS upon a valid sale. As will be discussed in detail later, the ST 500 cannot be released from the article 100 by an individual except using the system 200A/method 200B disclosed herein. As a result, the cashier, or any other store employee, is unable to manually remove the security tag 120 from the article, thereby preventing "sweethearting." In addition, where sale information of the article is scanned at the POS, the system 200A/method 200B makes the sale more efficient by combining the scanning along with the ST 500 release. Thus, it is within the broadest scope of this invention to cover any system/method whereby a ST 500 is automatically released during the valid sale of the article without store employee involvement and/or where such release occurs substantially simultaneously with scanning of the article at the POS.

The system 200A comprises a reader 202, an electronic point of sale machine (POS) machine 204 (e.g., a cash register (e.g., Sharp XE-A301/A302ECR/EPOS, Gold G215, etc.), a credit/debit card reader, any type of money/currency transfer machine for supporting the purchase of the article, etc.) and an automated releaser 206. When the article 100 is first delivered to the store, the article 100 identification, and other sales data related to that article 100, are stored in a memory in the POS machine 204. In operation (FIG. 1B), when a patron arrives at the point of sale (POS), the cashier positions the ST 500 and article 100 so that the reader 202 can obtain article information (product identifier, UPC number, status information, etc.) from the ST 500 (and/or article 100) and pass that information to the POS machine 204. If the POS machine 204 determines that the article is a valid article ready for sale, as will be discussed in detail later, the POS machine 204 rings up the sale while commanding the automated releaser 206 to activate and release the ST 500 from the article 100. Upon release, the cashier can retrieve the ST 500 for the store's re-use on another item. If, on the other hand, the POS machine 204 determines that the sale is invalid, the automated releaser 206 does not operate to release the ST 500 and the sale of that item is terminated, with the ST 500 remaining attached to the article 100.

One exemplary embodiment of such a system and method is described below and set forth in FIGS. 2-4B. It should be understood that this is by way of example only and is not limited to the system and methods shown therein.

Figure 2:
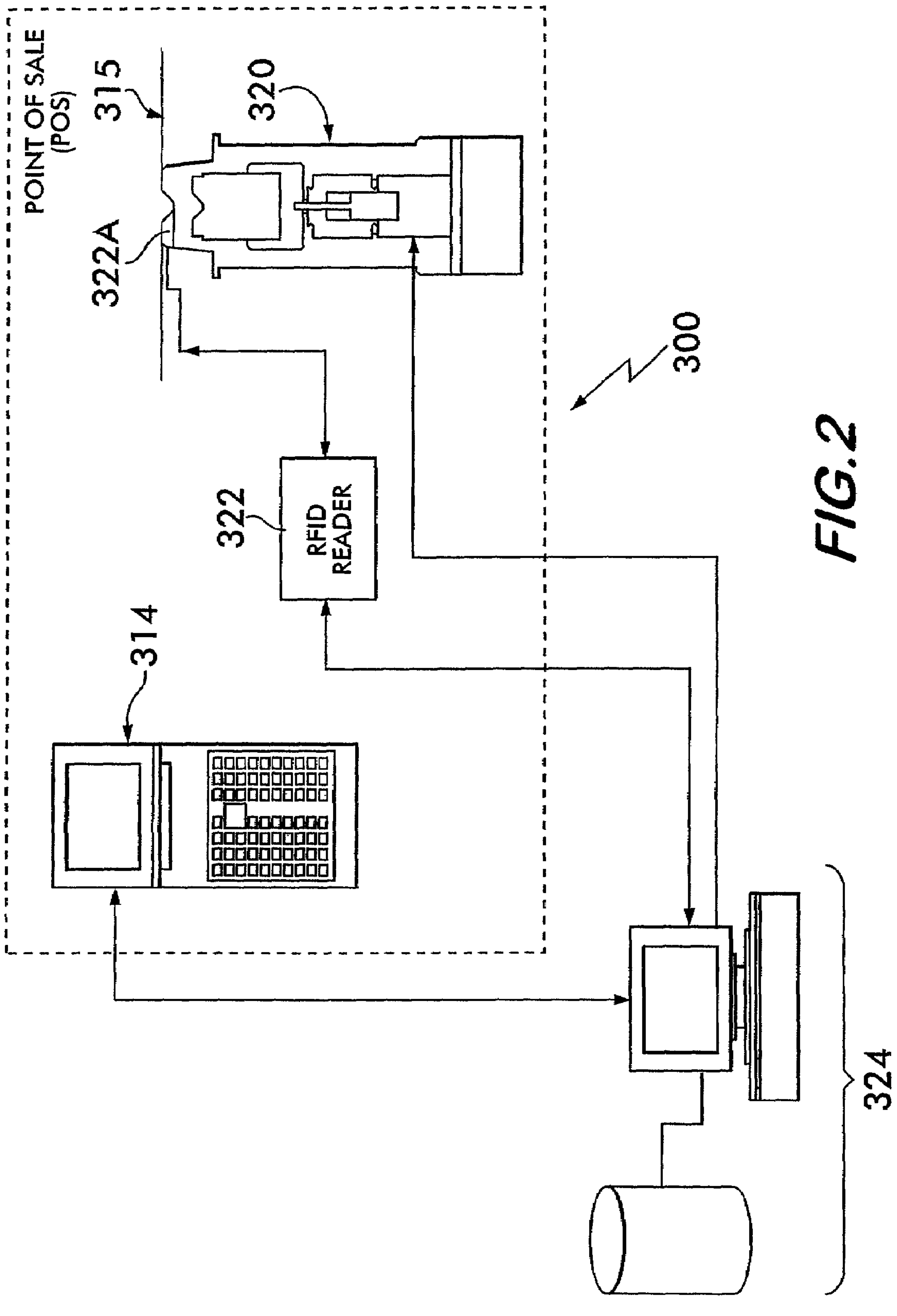
FIG. 2 is a block diagram of an exemplary automated detachment system in accordance with the present invention.

In FIG. 2, an exemplary authenticated detachment system 300 is depicted. The system 300 includes an automated detacher 320, a radio frequency identification (RFID) reader 322, including an RFID antenna 322A, an electronic POS machine 314 (e.g., a cash register (e.g., Sharp XE-A301/A302ECR/EPOS, Gold G215, etc.), a credit/debit card reader, any type of money/currency transfer machine for supporting the purchase of the article, etc.) and a database 324. The automated detacher 320, RFID reader 322/antenna 322A and POS machine 314 are located at a store point of sale (POS); the database 324 may be located remote from the POS.

Figure 3:
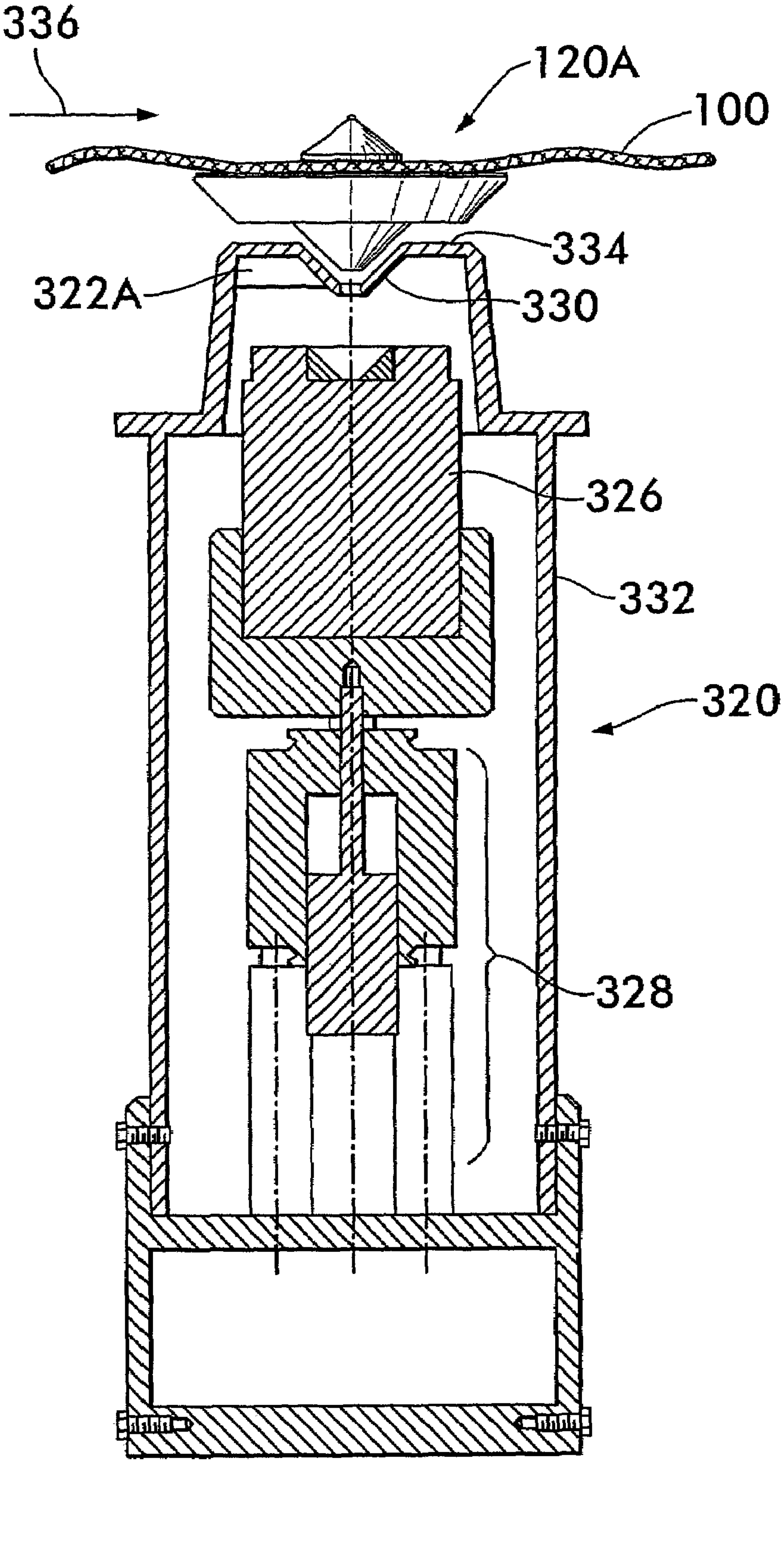
FIG. 3 is a cross-sectional view of an automatic detacher showing a security tag positioned for tag release.

The automated detacher 320, as shown in FIG. 3, comprises a permanent magnet 326 that is displaceable by command of a motor controller 328. In particular, the magnet 326 is vertically-displaceable such that the magnet 326 can be moved into close proximity to an upper cavity 330 of the detacher 320 or moved downward, away from the upper cavity 330. The magnet 326, the motor controller 328 and related components are contained within a detacher housing 332. The detacher 320 is located at the POS such that the housing 332 is concealed beneath the checkout counter 315 (FIG. 2) at the POS, with the upper surface 334 of the housing 132 being flush with the counter 315. Thus, the upper cavity 330 forms a cavity in the counter 315. Moreover, as will be discussed later, the permanent magnet 326 is of such a large weight, that it is nearly impossible for a person to carry such a similarly large permament magnet to generate the requisite magnetic field to release the ST 500 illegally. However, it should be understood that use of the permanent magnet 326 is by way of example only and that it is within the broadest scope of the present invention to include any magnetic field source, e.g., electromagnet, that can generate the requisite magnetic field to release the ST 500, as will be discussed later. The electromagnet 400 includes a free-wheeling diode 402 across the coil 403 leads to dissipate the magnetic field current when the coil is de-energized. Power may be provided to the coil 403 from an AC/DC converter 404 that converts AC utility power into DC current for energizing the electromagnet 400. A switch 406, coupled to the database 324, allows or denies DC power to the coil 403 as commanded by the database 324.

The RFID reader 322 is located at a sufficient distance from the permanent magnet 326 (or electromagnet 400) so as not to disrupt the operation of the reader 322 electronics. The RFID reader antenna 322A, however, is located just beneath the upper surface 334 of detacher housing 332; the DC magnetic field produced by the permanent magnet 326 (or electromagnet 400) does not interfere with the transmission/reception operation of the antenna 322A. The RFID reader 322 is coupled to the database 324 which permits the RFID reader 322 to transmit the article identification (ID)/sales information to the database 324.

The database 324 is coupled to the electronic POS machine 314 and to the motor controller 328. In operation, when a patron arrives at the point of sale (POS), the cashier positions the ST 500 and article 100 so that the reader 322 can obtain article information (product identifier, UPC number, status information, etc.) from the ST 500 (and/or article 100) and pass that information to the database 324. The database 324 communicates with the POS machine 314 and the POS machine 314 "rings up" the sale; the POS machine 314 then confirms the "ring-up" to the database 24. The database 24 then commands the automated releaser 320 to activate and release the ST 500 from the article 100. The cashier is then able to remove the ST 500 from the article, thereby allowing the store to re-use the removed ST 500 on another item. If, on the other hand, the database 324 determines that the sale is invalid, the automated releaser 320 does not operate to release the ST 500 and the sale of that item is terminated, with the ST 500 remaining attached to the article 100.

Figure 4:
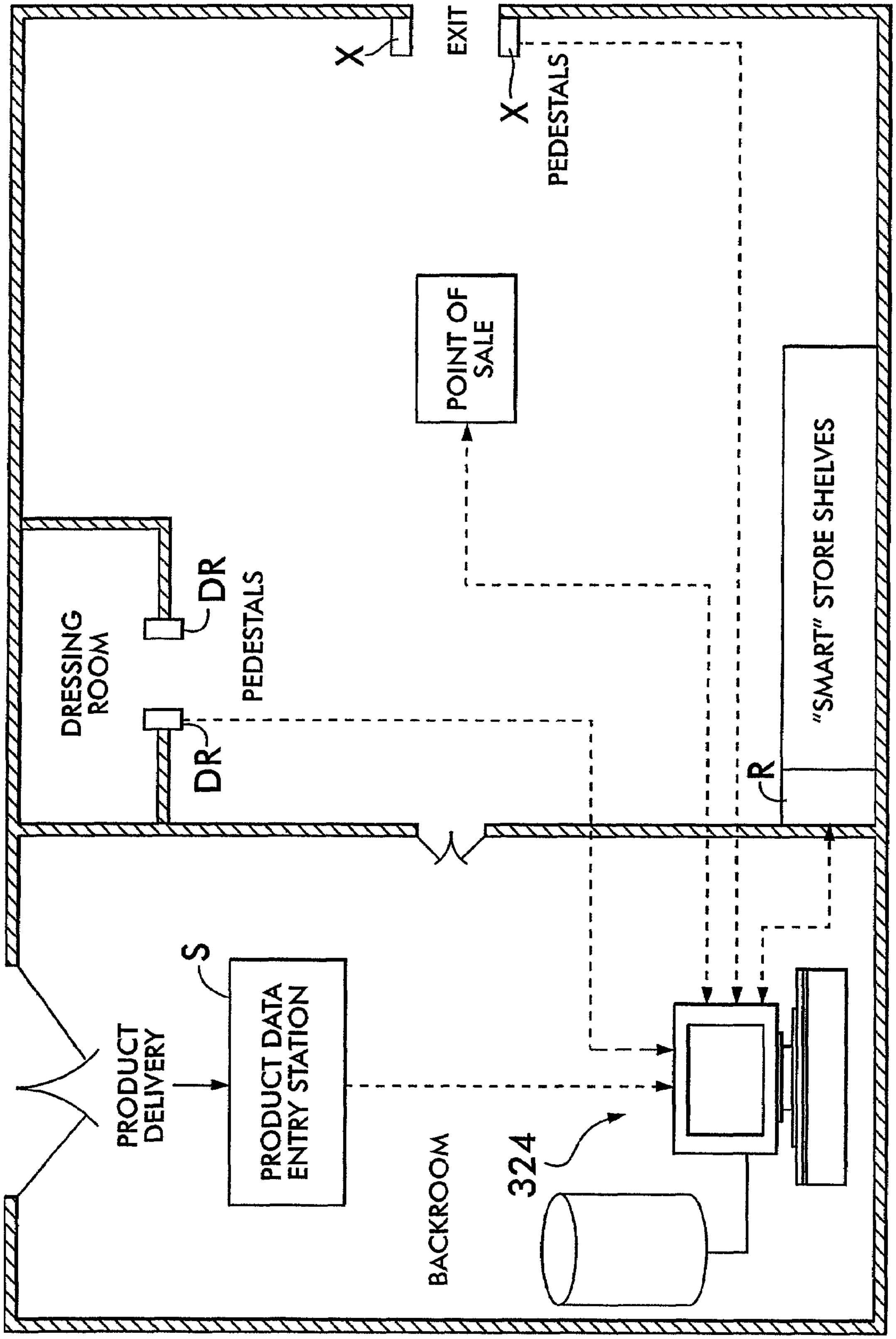
FIG. 4 is a block diagram of the exemplary detachment system of FIG. 2 integrated into a store environment.

This exemplary authenticated detachment system 300 can be integrated with other aspects of the store operation as shown in FIG. 4. For example, the store may include a product entry station S where articles 100 originally delivered to the store in the backroom and then scanned (e.g., UPC barcode reader, RFID reader, etc.) and entered into the database 324; and, if not already attached or otherwise secured to the article 100, the ST 500 is attached to the article 100. When the article 100/ST 500 is placed on the store shelf, the store shelf may include a reader R (e.g., RFID reader, etc.) that informs the database 324 of the its current location on the shelf. The store may also include interrogation pedestals (DR) located at a dressing room which detect the passage of the article/ST 500 therethrough and which inform the database 324 of the current location of the ST 500/article 100 at the dressing room location. Certainly, as discussed earlier, the presence of the interrogation pedestals X at the exit of the store provide for alerting store personnel if the ST 500/article 100 is removed without a valid sale. Thus, the database 324 is able to track the movement of the article 100 through the store. All of these components are linked to the database 324 either by wires or via a wireless connection.

Before a further discussion of the system/method of the present invention is made, the ST 500 is discussed.

By way of example only, the ST 500 used with the detacher 320 is a hard tag. In the electronic article surveillance (EAS) industry, a "hard tag", refers to a re-usable tag which is intended to be removed from an article (merchandise) at the point of sale to be re-used on other merchandise. Hard tags typically have an injection-molded outer casing. This type of tag is typically found in the apparel industry. By way of example only, one type of EAS hard tag is available from Checkpoint Systems, Inc., Thorofare, N.J., and because of its appearance, is referred to as the UFO style, also available in a mini-UFO style, as well as other styles. However, unlike those types of hard tags, the ST 500 cannot be released in any other manner except by use of the detacher 320. Also, these UFO style and mini-UFO style hard tags typically operate in the EAS ranges (see table below), whereas the ST 500 (also referred to as an "identification tag") operates in the RFID range (see table below).

| EAS Operation | | RFID Operation | |
|---|---|---|---|
| Low Frequency (LF) | 5 kHz-12 kHz | Low Frequency (LF) | 100 kHz-400 kHz |
| | | High Frequency (HF) | 2 MHz-14 MHz |
| Acousto-Magnetic (AM) | 50 kHz-70 kHz | Ultrahigh Frequency (UHF) | 860 MHz-930 MHz |
| Radio Frequency (RF) | 2 MHz-14 MHz | Microwave Frequency | 2.3 GHz-2.6 GHz |

The ST 500 requires the use of an integrated circuit (IC) that emits an identification code that can be detected by the reader 322 when the ST 500 is positioned adjacent the reader antenna 322A or passes through the pedestals DR or X. This can be accomplished using an RFID (radio frequency identification) IC that forms a part of the resonant circuit RC or antenna AN. For example, for low frequencies (100 kHz-400 kHz, preferably 125 kHz) or for high frequencies (e.g., 2 MHz-14 MHz), a resonant circuit RC is used; for ultrahigh frequencies (UHF, e.g., 860 MHz-930 MHz) or microwave frequencies (e.g., 2.3 GHz-2.6 GHz), a dipole antenna A is used, where the length of the dipole antenna is some multiple fraction of the transmitter signal wavelength. Thus, when the ST 500 is positioned adjacent the reader antenna 322A, or passes through the pedestals DR or X, the ST 500 is subjected to transmitter signal, and the resonant circuit RC or antenna AN will respond to the particular interrogation signal frequency to which the resonant circuit RC/antenna AN is tuned, thereby emitting the signal containing the data associated with the store item.

Figure 5:
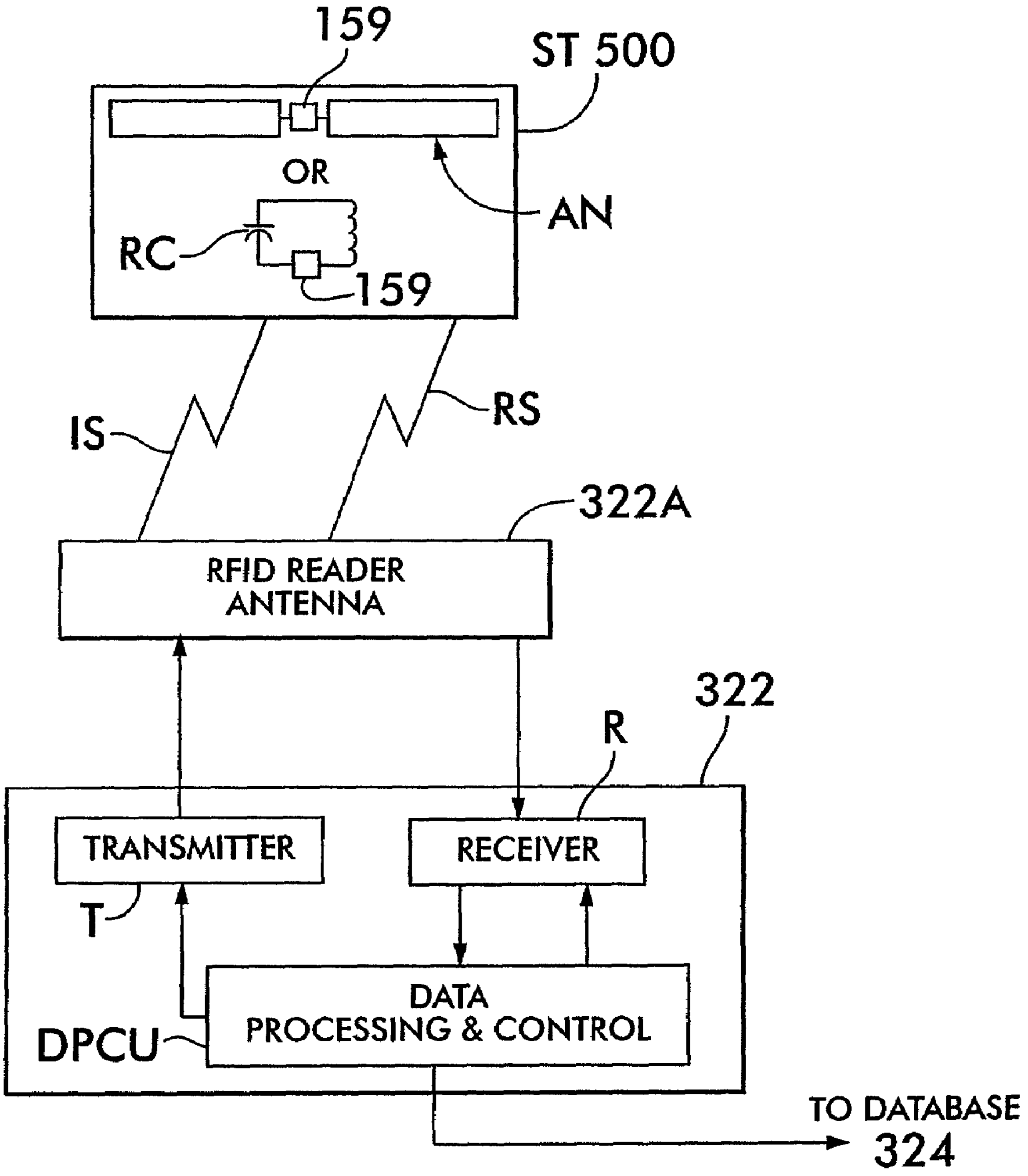
FIG. 5 is a functional diagram of the security tag of the present invention interface with the reader of the exemplary automated detachment system.
Figure 6A:
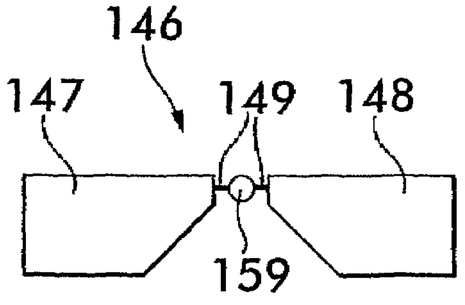
FIGS. 6A-7D depict various exemplary dipole antenna configurations that can be used with the security tag of the present invention.
Figure 6B:
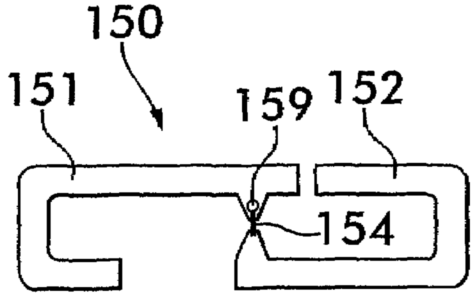
Figure 7A:
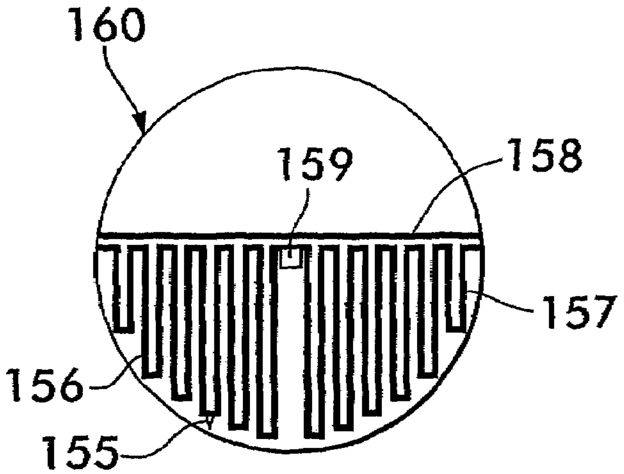
Figure 7B:
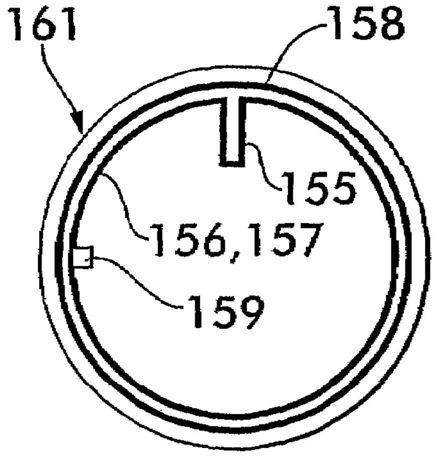
Figure 7C:
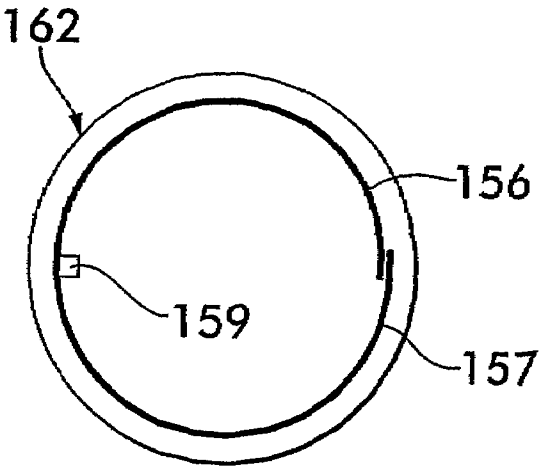
Figure 7D:
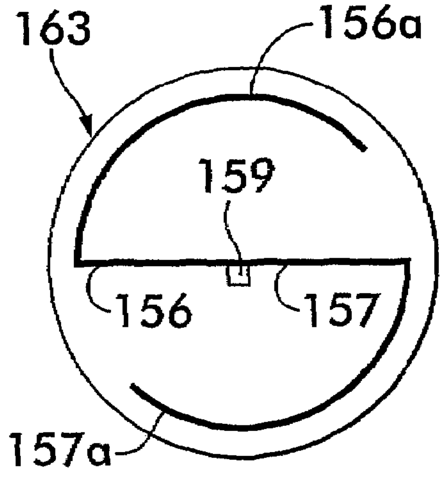

The RFID IC 159 (FIG. 5) comprises a memory that contains data (e.g., identification code, status code, etc.) related to the article 100 to which the ST 500 is attached. As shown in FIG. 5, when the ST 500 is subjected to the interrogation signal IS from the RFID reader antenna 322A at the tuned frequency of the resonant circuit RC, or antenna AN, the resonant circuit RC or antenna AN temporarily powers the RFID IC 159 and a response signal RS is transmitted back to the RFID reader 322 comprising that article data. Such tags are known as passive security tags because the RFID IC 159 is powered only by the signal received as opposed to having an on-board battery in the ST 500 itself; U.S. Pat. No. 5,446,447 (Carney et al.), U.S. Pat. No. 5,430,441 (Bickley et al.) and U.S. Pat. No. 5,347,263 (Carroll et al.), all of whose entire disclosures are incorporated by reference herein, provide examples of such passive security tags. However, it should be understood that it is within the broadest scope of the present invention to include active security tags also, i.e., security tags that include an on-board power supply such as a battery (ies).

As also shown in FIG. 5, the RFID reader 322 basically comprises the reader antenna 322A, a transmitter T and a receiver R coupled to a data processing and control unit DPCU, similar to that disclosed in U.S. Pat. No. 6,025,780 (Bowers et al.) whose entire disclosure is also incorporated by reference herein. The DPCU configures the article data for transmission to the database 324. RFID readers, also known as "interrogators" such as these may be built using circuitry as described in U.S. Pat. No. 3,752,960 (Walton); U.S. Pat. No. 3,816,708 (Walton), U.S. Pat. No. 4,223,830 (Walton) and U.S. Pat. No. 4,580,041 (Walton), all of whose entire disclosures are incorporated by reference herein.

FIGS. 6A-7D provide some example configurations of a dipole antenna including the RFID IC 159 that can be used in the ST 500 of the present invention. The dipole 146 (FIG. 6A) includes the dipole elements 147, 148 for receiving electromagnetic energy at a predetermined frequency and energizing an integrated circuit 145. The RFID IC 159 can be disposed between the dipole elements 147, 148 and wire bonded to them using wires 149 in a conventional manner. The predetermined response frequency of the dipole 146 is primarily determined by the length of the dipole elements 147, 148, wherein the length of the dipole 146 on a substrate 150 can be approximately one-half of the wavelength of the predetermined response frequency. The S-shaped dipole 150 (FIG. 6B) includes the dipole elements 151, 152, which can be formed with a combined length exceeding the longitudinal dimension of the dipole 150 because of their S-shape. Furthermore, the dipole elements within both dipoles 146, 150 can be easily realized in any length required to provide the resonant frequencies that are useful in the field of security tag. Referring now to FIGS. 7A-7D there are shown the dipoles 160-163 wherein each of the dipoles 160-163 includes a respective pair of dipole elements 156, 157 for receiving electromagnetic energy and energizing a RFID IC 159 at a predetermined frequency. In addition to shapes such as the S-, meandering, bent coil, overlapping and Z-shapes shown herein for illustrative purposes, an almost unlimited number of additional dipole conductor shapes can be used.

In view of the foregoing, the construction of the ST 500 locking mechanism will now be discussed.

Figure 8A:
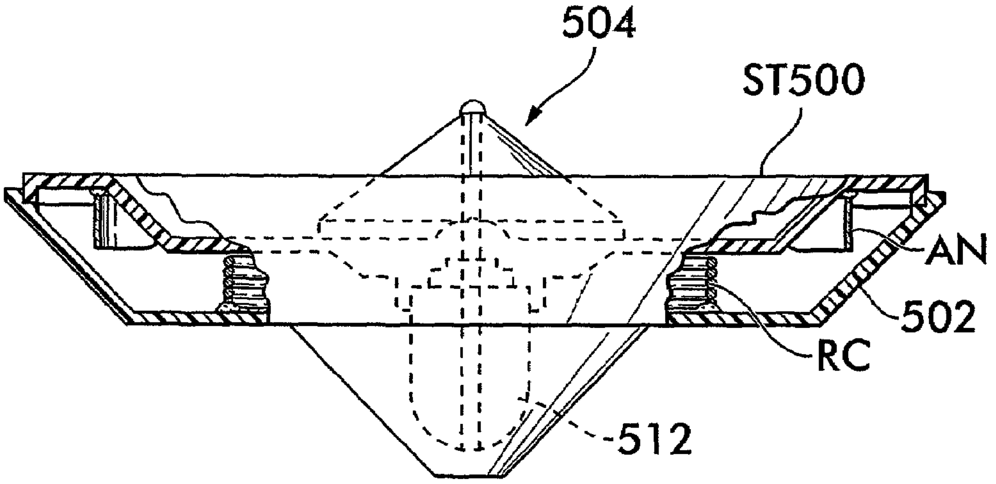
FIG. 8A is a cross-sectional view of the exemplary anti-theft tag using balls and a compression element to lock the tag to an article.
Figure 8B:
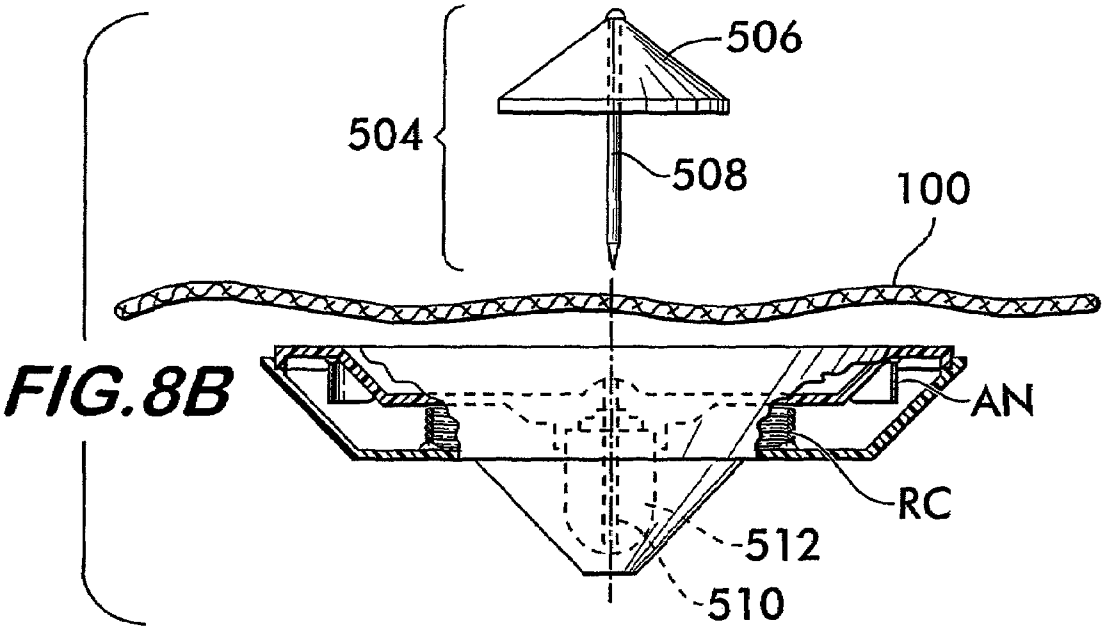
FIG. 8B is an exploded view of the exemplary anti-theft tag depicting how it is attached to an article.

As shown in FIG. 8A, the ST 500 comprises a housing 502 in which an RFID element (e.g., an RFID IC coupled to a resonant circuit RC comprising a coil/capacitor, or to a dipole antenna AN, etc.) is contained. The ST 500 further includes a detachable portion 504 that comprises a head 506 and pin 508. To secure the ST 500 to an article A, the pointed, free end of the pin 508 is passed through the article A and into a passageway 510 (FIG. 8B) in a locking mechanism 512 (e.g., a spring-loaded, ball/clutch locking device used in Checkpoint System Inc.'s UFO style hard tags), thereby rendering it nearly impossible for someone to separate the detachable portion 504 from the housing 502 and release the article A. With the ST 500 attached to the article A, as the combination is moved through a store and passes through the pedestals DR or X (FIG. 4), the respective transmitters (not shown) in those pedestals issue the interrogation signal IS to which the RFID element in the ST 500 responds. If the article A/ST 500 is attempted to pass through the pedestals X at the exit, upon receipt of the RFID element response signal by the pedestal receiver (not shown), an alarm will be set off. On the other hand, if the article A is properly purchased, the ST 500 is subjected to the automated detacher of the present invention that permits the cashier to remove the pin 508 from the locking mechanism 512, thereby releasing the detachable portion 504 from the housing 502 and allowing the article A to be free of the ST 500. In particular, to release the pin 508, the ST 500 must be subjected to a sufficient magnetic field to cause the internal displaceable components of the locking mechanism 512 to release the pin 508, thereby allowing the detachable portion 504 to be removed from the housing 502. It should be understood that the internal displaceable components of the locking mechanism 512 comprise as little ferromagnetic material as possible so that no ordinary hand-held magnet can displace these components; rather, only a sufficiently strong magnetic field can displace these components to release the pin 508.

During the sales transaction, the cashier first swipes the ST 500 over the RFID reader antenna 122A (in the direction of arrow 336 in FIG. 3) and then places the protuberance 5 of the ST 500 into the upper cavity 330. This simple action permits the article identification (ID)/sales information to be transmitted to the database 324 and then places the ST 500 in position for automatic detachment, assuming the database 324 confirms a valid sale.

As mentioned earlier, with respect to FIG. 4, the database 324 is able to track the location of the article 100 as it moves through the store. When the article 100 is first entered into the database 324, a record is created in the database that may comprise:

Field 1: a unique identifier read from the RFID IC 159;
Field 2: barcode
Field 3: status The last field "status" may include the states of "InActive," "Insystem" or "InSubsystem", with the latter state corresponding to sub-areas, e.g., dressing rooms.

Figure 9A:
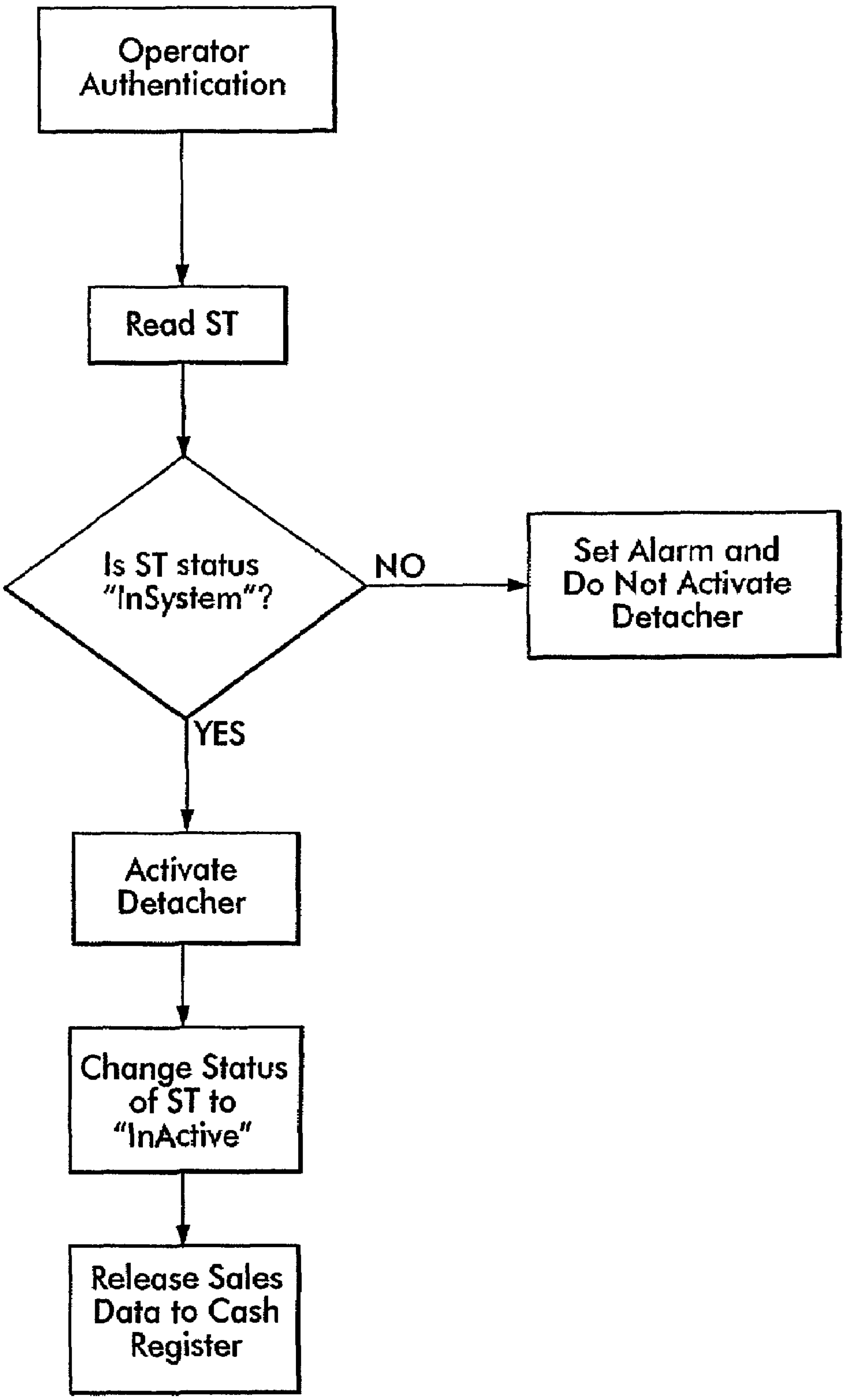
FIG. 9A is a flow diagram of the checkout process using the system and method of the present invention.

The following operation describes the use of the authenticating detachment system 300 in a clothing store but this is by way of example only and not by way of limitation. As shown in FIG. 9A, a flow diagram depicts the checkout process. Initially, the cashier must be permitted access to the POS machine 314. This is accomplished via an operator authentication process that requires the cashier to enter identification data to the system, e.g., via the POS machine 314; thus, the cashier must have proper identification to use the POS machine 314. Next, if a patron brings an article 100 with the ST 500 attached thereto to the checkout POS, the cashier places the ST 500 at the automated detacher 320 (as discussed previously) where the RFID reader 322 reads the article identification and passes this information to the database 324. The database 324 then compares the identification data against its records and if the status of that particular article is "InSystem" (hence "ready for sale"), then the database 324 activates the automated detacher 324 to release the ST 500 while releasing the sales information of that article 100 to the POS machine 314. The database 324 then changes the status entry for that ST 500 to "InActive". If, on the other hand, when the RFID reader 322 first passes the article identification to the database 324 and the status field for that record does not show "InSystem", a violation is indicated and the ST 500 is not released from article 100; furthermore, no sales data is transmitted to the POS machine 314 and the sales transaction halted.

Figure 9B:
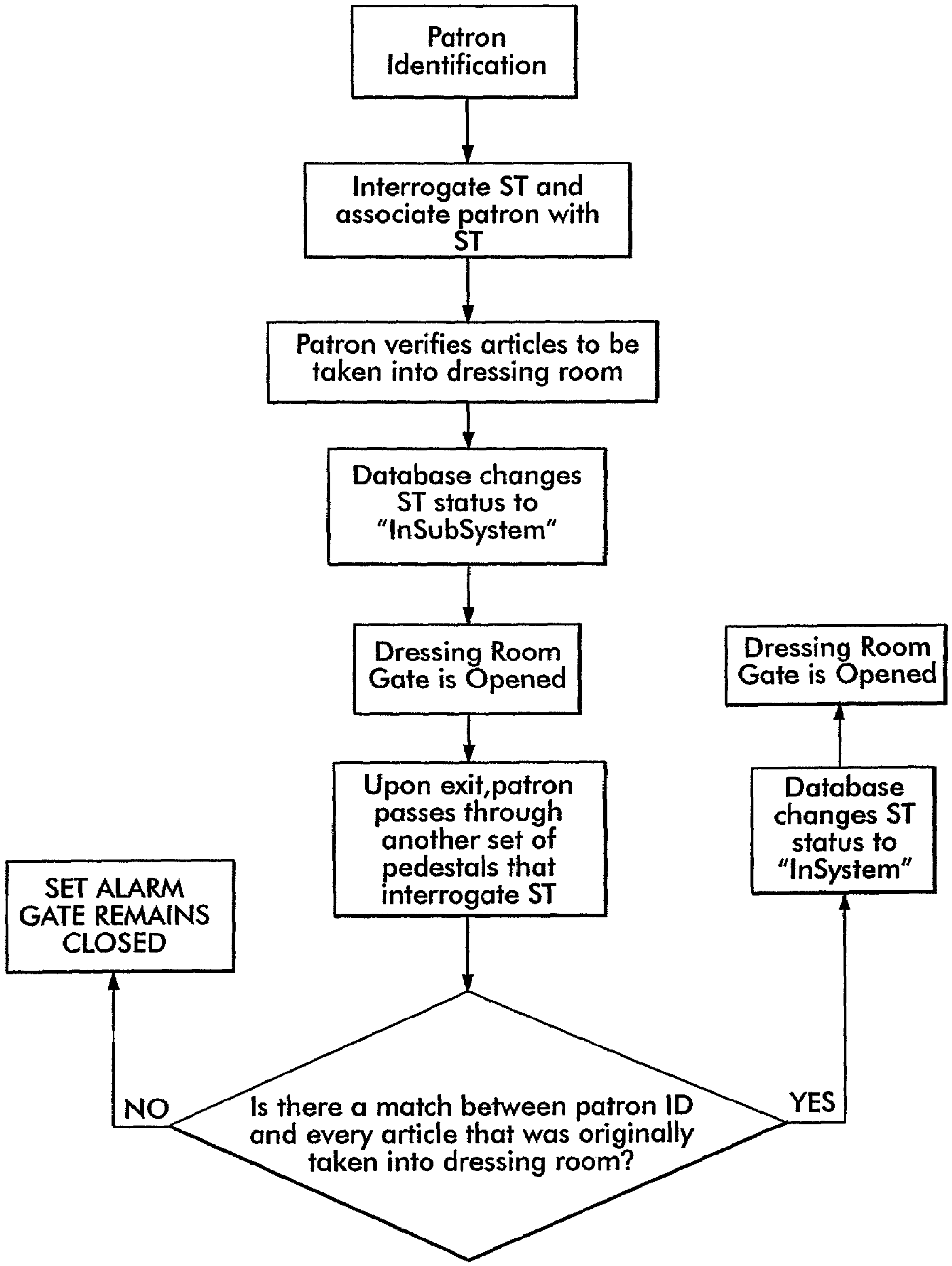
FIG. 9B depicts a flow diagram of the changing room process using the system and method of the present invention.

FIG. 9B depicts a flow diagram of the changing room process. As the patron approaches the dressing room with the article 100/ST 500, the patron provides identification to a nearby reader (not shown) and as the patron passes through the dressing room pedestals DR, the RFID IC 159 in the ST 500 delivers the identification of the article 100 which is then associated with the patron ID and transmitted to the database 324. The patron is asked to confirm the article(s) 100 being taken into the dressing room. Once this verification is completed, the database 324 changes the status of the record for that article 100 from "InSystem" to "InSubsystem." Although not shown, a gate at the dressing room is then opened to allow the patron to enter the dressing room. Once the patron has completed using the dressing room, the patron is directed to another set of dressing room pedestals where the articles 100/ST 500 being brought out of the dressing room by the patron are interrogated and the article 100 identifiers passed to the database 324. The database 324 then conducts a verification of each article 100 that was originally taken into the dressing room with those that are leaving the dressing room for that particular patron. If there is a match on all articles 100, the database restores the "InSystem" status to the status field for that particular article and the gate is opened to allow the patron to leave the dressing room area. If, on the other hand, there is no match, an alarm is activated and the gate remains closed.

To prevent the transaction of all sales in case of a failure of the authenticated detachment invention, the unpowered default position of the permanent magnet 326 is the upward position, thereby allowing the ST 500 to be released if the cashier needs to conduct the transaction manually. Furthermore, movement of the permanent magnet 326 by the motor controller 328 is slow enough that the differential magnetic field in the patron's credit cards is not fast enough to erase the credit cards.

Figure 3A:
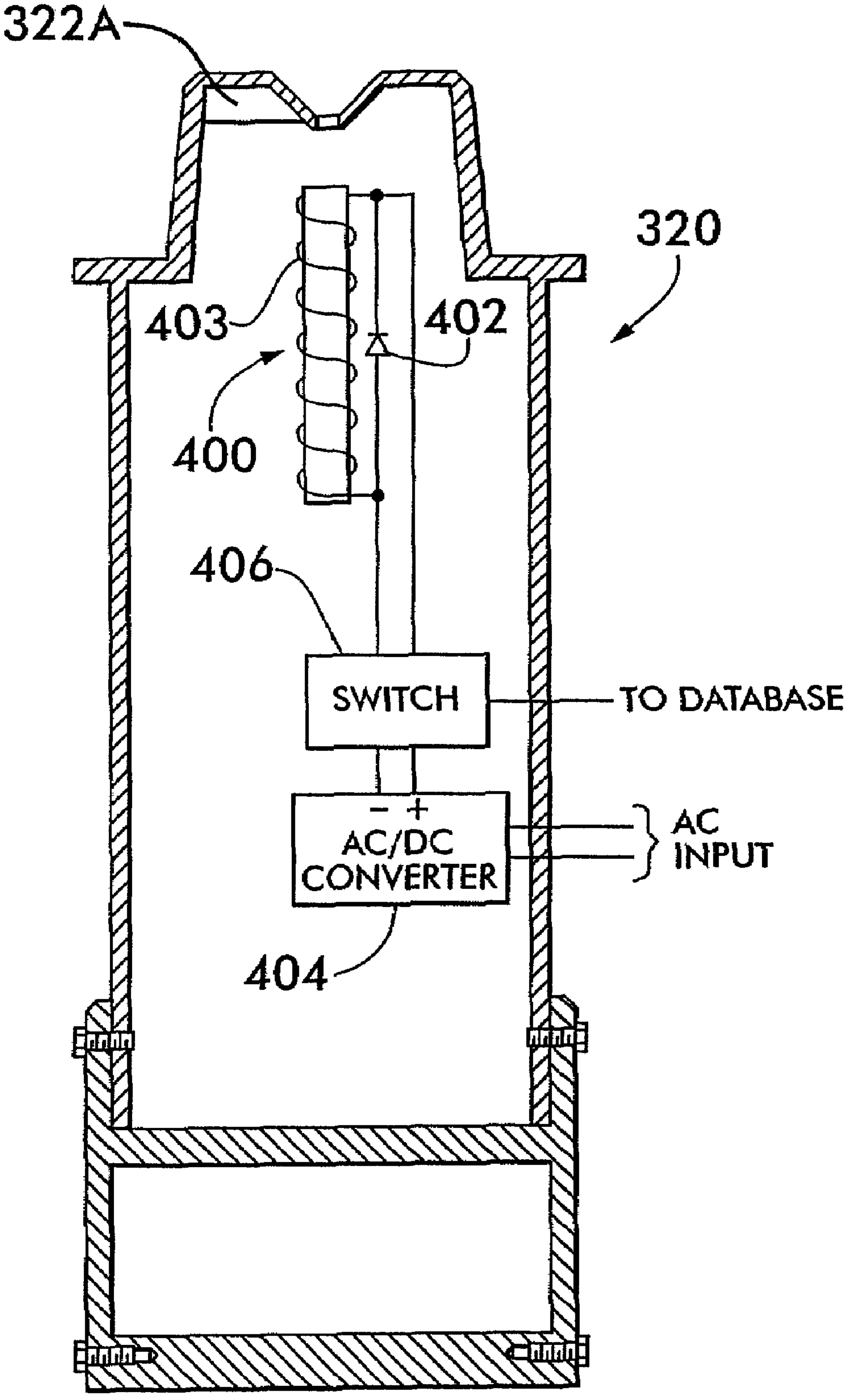
FIG. 3A is a cross-sectional view of an alternative automatic detacher using an electromagnet and showing a security tag positioned for tag release.
Figure 10:
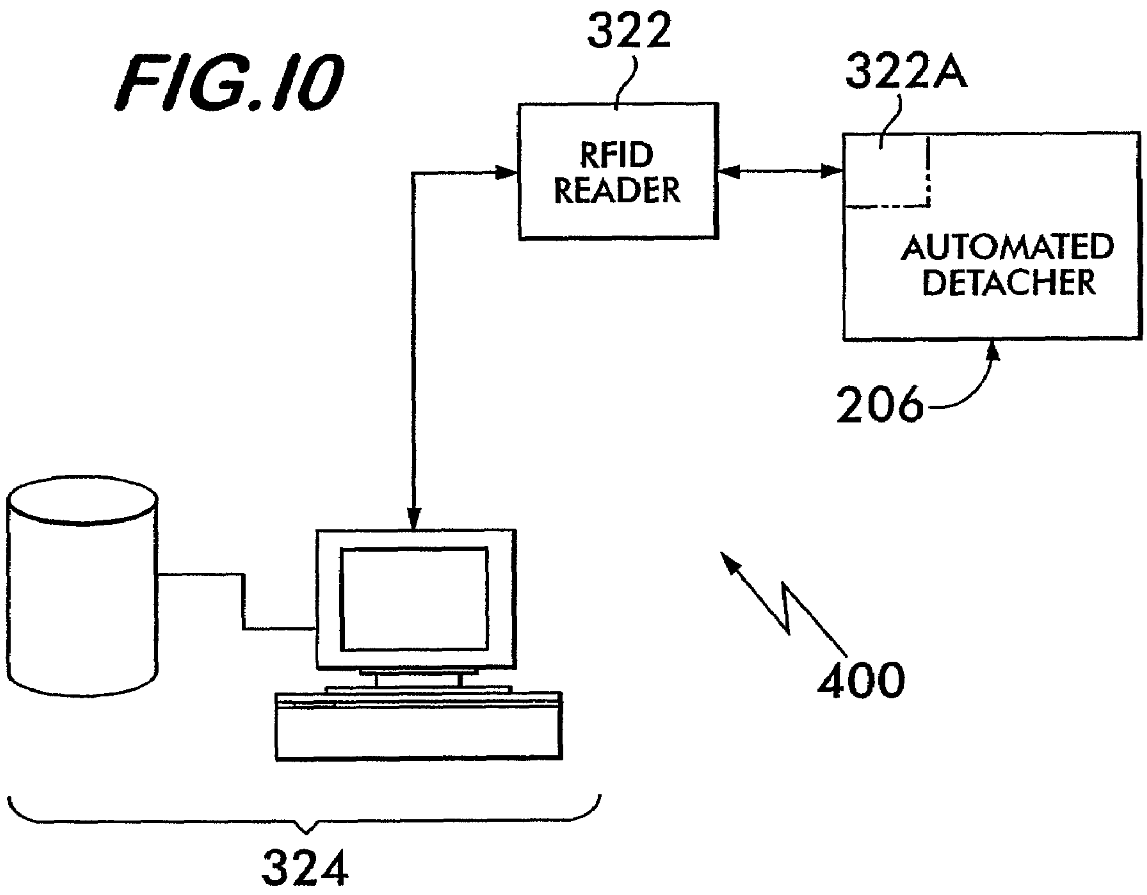
FIG. 10 is a block diagram of another embodiment of the present invention that does not involve validation of sale but rather reads the security tag and releases the security tag from the article while storing the security tag information/status in a database, as well as the detacher identification and the time and date of the release action.

FIG. 10 is a block diagram of another embodiment of the present invention that does not involve validation of sale but rather simply reads the ST 500 and releases the ST 500 from the article while storing the ST 500 information/status, as well as the detacher identification and the time and date of the release action. In particular, the system 400 comprises the RFID reader, the database 324 and the automated detacher 206. In this system, the operation of the detacher 206 is not conditioned on a valid sale. Instead, once the RFID reader 322 obtains the ST 500 information, the detacher 206 activates to release/unlock the ST 500. The status of the ST 500, as previously stored in the database 324 is updated, as discussed previously. Thus, the RFID reader 322 is informed of which automated detacher 206 it is coupled to and a time stamp can also be stored in the database 324 when the automated detacher 206 releases the ST 500. Other than that, the operation of the ST 500 and the operating frequency ranges of the RFID reader 322 and the ST 500 is the same as previously discussed. By way of example only, the automated detacher 206 may comprise a displaceable permanent magnet, as discussed earlier with regard to FIG. 3, or may comprise an electromagnet as discussed earlier with regard to FIG. 3A. The only difference in operation of these exemplary magnetic releasers in the system 400 is that there operation is not conditioned on the determination of a valid purchase of the article. As a result, the automated releaser 206 in the system 400 is not coupled to the database 324, nor to any POS machine 204. Rather, once the RFID reader 322 reads the ST 500, the automated releaser 206 is activated. Where such detachers utilize some form of magnetic releasers, only the RFID antenna 322A (shown in phantom) is located at the detacher position, for the reasons discussed earlier. However, it is within the broadest scope of the present invention to include other types of automated detachers 206 which are not limited in any way to magnetic releasers. The important aspect is that the identity of the automated detacher 206 is conveyed to the database via the RFID reader when the release occurs. Thus, the detacher 206 identity, along with the date and time of the release, is stored in the to the database 324.

It should be understood that the term "security tag" as used throughout this Specification includes any device which reflects electromagnetic energy for the purpose of identifying itself to a reader/interrogator and is not limited to only IC-based devices. Thus, an electronic article surveillance (EAS) tag, such as RF, EM or AM, would be considered a one-bit RFID tag. As a result, the "reader" used in the EAS frequency ranges would comprise a transmitter/receiver pair tuned to an EAS frequency.

While the invention has been described in detail and with reference to specific examples thereof, it will be apparent to one skilled in the art that various changes and modifications can be made therein without departing from the spirit and scope thereof.

What is claimed is:

1. A method for automatically detaching a security tag from an article only upon the sale of the article, said method comprising:

locating a reader at the point of sale (POS) that reads the security tag to identify the article being purchased;

providing a database in communication with said reader and wherein said database stores a status of the article, said database verifying that the status of the read article is ready for sale;

coupling a detacher to said database to be in communication with said database;

controlling said detacher by said database to release said security tag from the article only if said database verifies that said read article is ready for sale;

coupling a POS machine to said database to be in communication with said database; and conveying the article identity and sales information to said POS machine upon said release of the security tag from the article.

2. The method of claim 1 wherein the security tag comprises a locking mechanism having displaceable components containing small amounts of ferromagnetic material, and wherein said step of controlling said detacher comprises generating a magnetic field that interacts with said ferromagnetic material to cause said components to be displaced, thereby unlocking said locking mechanism.

3. The method of claim 2 wherein said step of coupling a detacher to said database comprises providing a permanent magnet within said detacher having a weight that requires the use of a mechanism to move said permanent magnet proximate the security tag when said detacher is commanded to release the security tag.

4. The method of claim 2 wherein said step of coupling a detacher to said database comprises providing an electromagnet that is energized for creating said magnetic field.

5. The method of claim 1 further comprising the step of tracking where an article is by said database, said database updating said status as the security tag attached to the article passes readers other than said reader at the POS, said readers other than said reader at the POS being in communication with said database.

* * * * *